United States Patent
Broussard

[19]

[11] Patent Number: 5,861,575
[45] Date of Patent: Jan. 19, 1999

[54] DEVICE AND METHOD FOR A FLUID STOP SPLICE FOR A SUBMERSIBLE CABLE

[76] Inventor: Blaine L. Broussard, 306 Broussard Rd., Loreauville, La. 70552

[21] Appl. No.: 616,531

[22] Filed: Mar. 19, 1996

[51] Int. Cl.[6] ................................................ H02G 15/22
[52] U.S. Cl. ............................................. 174/20; 174/74 R
[58] Field of Search .............................. 174/19, 20, 74 R, 174/74 A, 75 R, 76, 77, 71 R, 72 R; 439/272; 367/15, 130

[56] References Cited

U.S. PATENT DOCUMENTS

| | | | |
|---|---|---|---|
| 3,811,958 | 5/1974 | Maurer | 136/233 X |
| 3,912,855 | 10/1975 | Thompson et al. | 174/93 X |
| 3,914,014 | 10/1975 | James | 439/452 |
| 4,114,970 | 9/1978 | Hall, Jr. | 439/294 |
| 4,249,788 | 2/1981 | McNeel | 439/272 |
| 4,260,211 | 4/1981 | Mollere | 439/348 |
| 4,317,185 | 2/1982 | Thigpen et al. | 367/15 |
| 4,542,282 | 9/1985 | Brasky | 219/345 X |
| 4,549,039 | 10/1985 | Charlebois et al. | 174/72 R |
| 4,621,168 | 11/1986 | Bryant et al. | 174/88 C X |
| 4,696,539 | 9/1987 | Knowles | 385/70 |
| 4,732,628 | 3/1988 | Dienes | 156/48 X |
| 4,961,961 | 10/1990 | Vincent et al. | 427/140 |

*Primary Examiner*—Kristine L. Kincaid
*Assistant Examiner*—Chan N. Nguyen
*Attorney, Agent, or Firm*—Derek R. Van Gilder

[57] ABSTRACT

Submersible cables that are placed in a body of fluid such as water or other fluids such as chemicals or sewage often require a takeoff to be added to the submersible cable wherein a window is cut in the exterior insulation of the submersible cable or parent trunk exposing interior wires or fiber optical cables or tubes and the like. The device and method for this fluid stop splice for a submersible cable where the desired conductors such as wires, fibers or tubes of the takeoff are suitably spliced to the necessary or desired wires, fibers or tubes of the parent trunk cable is such that a cofferdam is placed around the spliced area of the cables, fibers or tubes and a glutinous material is pumped, poured, or injected into the cofferdam where the glutinous material cures around the splice of the cables, fibers and or tubes and further forms a fluid tight seal around the cables, fibers and tubes to further stop fluid flow into the parent truck when the primary cable and takeoff are submerged into the fluid and further prevents electrical leakage, or the distribution communication leakage of the cables, fibers or tubes.

5 Claims, 2 Drawing Sheets

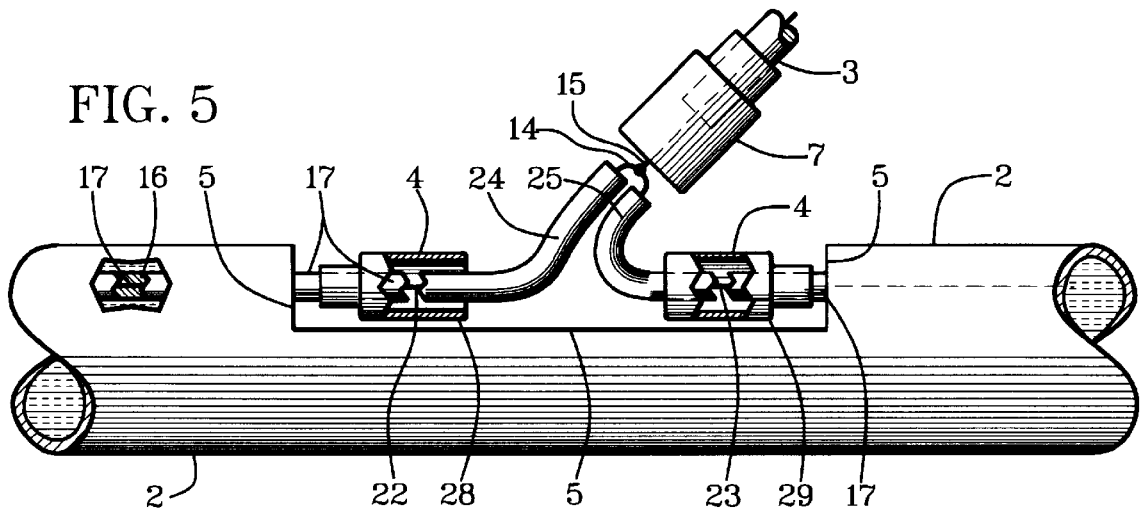
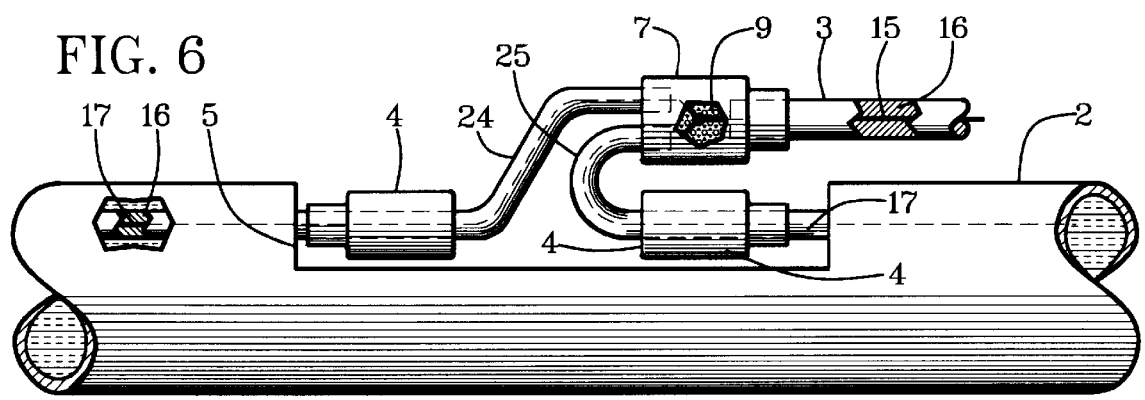
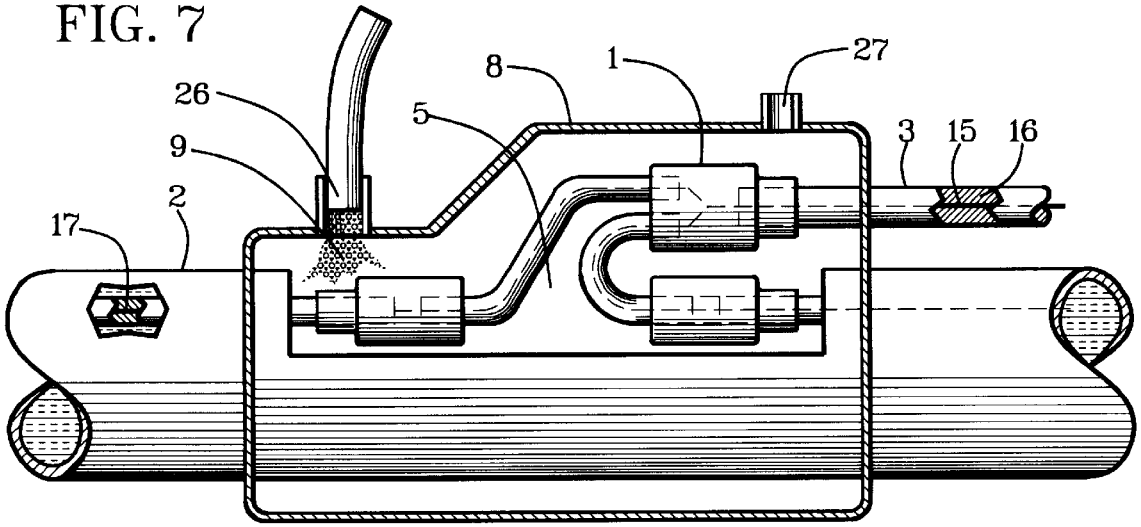

DEVICE AND METHOD FOR A FLUID STOP SPLICE FOR A SUBMERSIBLE CABLE

BACKGROUND OF INVENTION

Submersible cables that are placed on the sea floor, in sewage treatment plants, in chemical storage pits, or other tanks of liquid often require a takeoff cable to be added to the existing submersible cable. When the takeoff is added, the area wherein the takeoff is spliced to the parent trunk is often spliced in a manner that will allow fluid flow from an unknown location in to the takeout. The fluid could then migrate into parent trunk causing electrical leakage form one internal conductor to another internal conductor and the fluid could also destroy any cables, fibers or tubes in the parent trunk that require protection form foreign fluids, liquids or chemicals.

There are many methods of splicing cables, however, none of the methods or devices teach the splicing of a takeoff to a parent trunk wherein the splice is a fluid stop. Some of the other cable splicing devices are: Harian A. Vanes U.S. Pat. No. 3,914,014; Ernest M. Hall Jr. U.S. Pat. No. 4,114,970; William O. McNeel U.S. Pat. No. 4,249,788; John M. Mollere U.S. Pat. No. 4,260,211; Ben B. Thigpen et al U.S. Pat. No. 4,317,185; Gary A. Vincent et al U.S. Pat. No. 4,961,961; Robert G. Knowles U.S. Pat. No. 4,969,539.

These inventions have no means of eliminating or stopping fluid as it may flow from the takeoff to the parent trunk.

SUMMARY

It is the object of the present invention to provide a takeout splice connection that will prevent electrical leakage from one conductor to another conductor.

It is yet another the object of the present invention to provide a takeout splice connection that can be made in the field that will prevent fluid contamination and destruction to the parent trunk so that even if the takeoff is later damaged during operation, and fluid flows or migrates it cannot enter into and destroy cables, optical fibers or other components within the parent trunk.

It is still another object of the present invention to provide a method of splicing a cable, tube, or fiber optic to a parent trunk that can be used in any fluid environment.

The foregoing and other objects and advantages are attained by a superior splice connection wherein a takeout is spliced to the parent trunk with a shrink wrapped cofferdam filled with a glutinous material and a second cofferdam further filled with a glutinous material thus preventing any fluid from entering a damaged takeout and flowing into the parent trunk.

The feature of the present invention can be best understood together with further objects and advantages by reference to the following description then in connection with accompanying drawing, wherein like numerals indicate like parts.

BRIEF DESCRIPTION OF DRAWING

FIG. 5. an elevation of the takeout connected to the parent trunk.

FIG. 6. an elevation view of the shrink wrapped cofferdam around the takeout and splice connection.

FIG. 7. an elevation view of the shrink wrapped cofferdam being filled with glutinous material.

DETAILED DESCRIPTION OF THE PREFERRED EMBODIMENT

Figure 1:
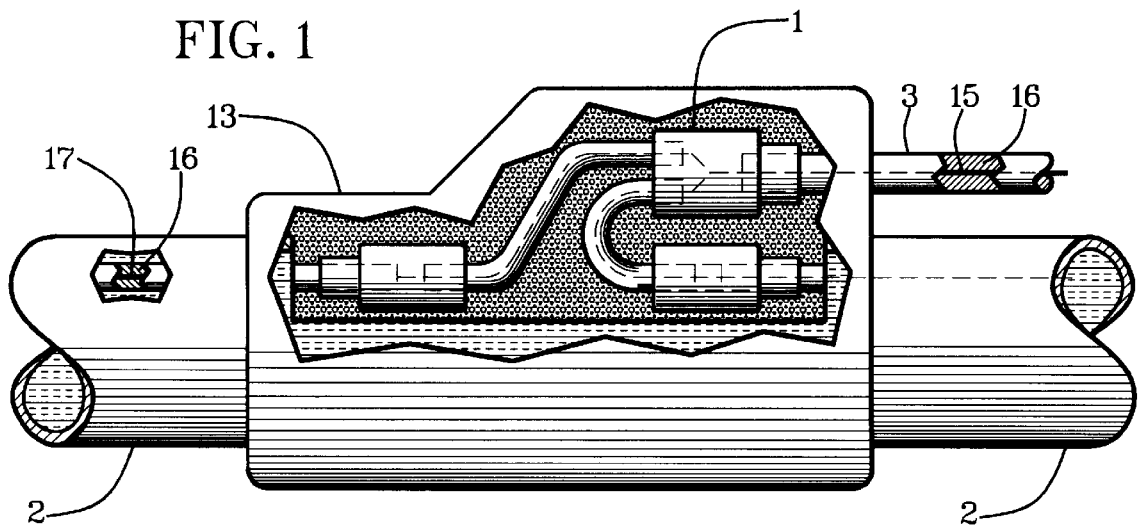
FIG. 1. an elevation of the parent trunk with takeout installed.

Referring to FIG. 1 there is shown a view of a completed takeout 3 shown suitably fixed to a parent trunk 2 with a fluid stop 1 and an outer seal 13.

The parent trunk 2 may contain tubes, wires, fiber optic cables and any other type of transmission means to transmit mechanical actions, fluid power, light impulses, electrical energy, or other impulses by design choice. The takeout 3 shown is an electrical takeout that utilizes a second electrical wire 15 as a conductor such as copper, aluminum, steel or any other suitable material by design choice. The second electrical wire 15 is further protected from any ambient environmental invasion or damage or electrical leakage by insulation or cladding 16 that is made of plastic, metal or any other suitable insulating material or combination of materials.

A first electrical wire 17 is shown inside of the parent trunk 2 and has been stripped and spliced to the takeout 3 as will be shown in other FIGURES. The means of stripping and splicing the first electrical wire 17 to the second electrical wire 15 will be shown FIGS. 4, 5, and 6.

Figure 2:
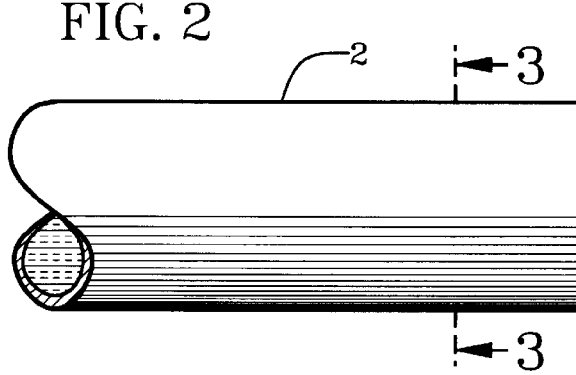
FIG. 2. an elevation view of the parent trunk prior to the takeout installed.

Referring to FIG. 2 there is shown an elevation view of the parent trunk 2 prior to the installation of the takeout.

The parent trunk is shown with various transmitting components such as electrical, hydraulic and fiber optical conductors.

Figure 3:
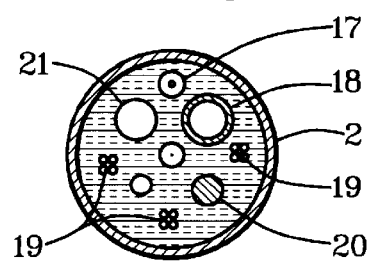
FIG. 3. an section elevation of the parent trunk as taken through FIG. 2.

Referring to FIG. 3 there is shown a section elevation of the parent trunk 2 as taken through FIG. 2.

The parent trunk 2 is shown with a first electrical wire 17, a power wire, a hydraulic tube 18, a fiber optical cable 19, a radio transmission wire 20, and a gas tube 21 all of which could be spliced to at least one takeout that will extend from the parent trunk 2.

Figure 4:
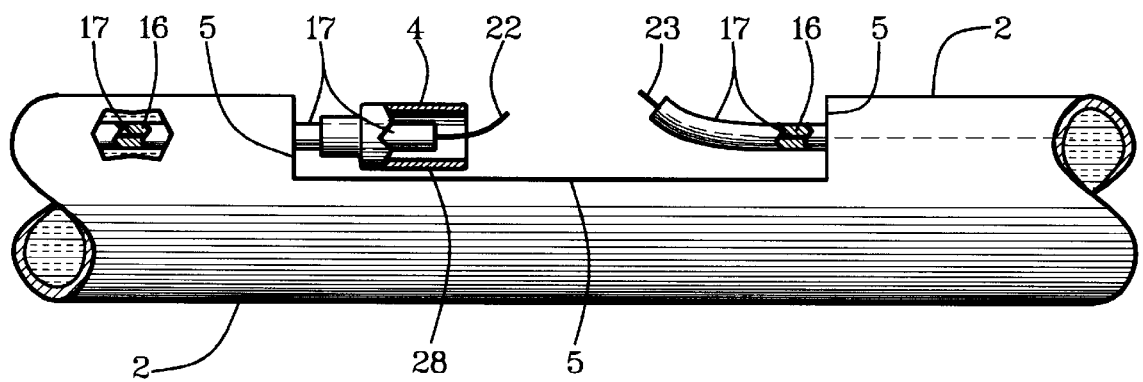
FIG. 4. an elevation view of the parent trunk with a window cut in the insulation and an internal element cut and pulled out.

Referring to FIG. 4 there is shown an elevation view of the parent trunk 2 with a window 5 with a first end and second end suitably formed in the parent trunk 2 to allow access to the various components contained in the parent trunk 2. For the purpose of brevity, only the first electrical wire 17 will be shown spliced to a takeout.

The first electrical wire 17 with a first end 22 and a second end 23 is shown exposed, and cut with the insulation or cladding 16 stripped away from the first end 22 and the second end 23 of the electrical wire 17 to make ready for the splicing of a takeout. A third cofferdam 28 is shown pulled over the first end 22 of the first electrical wire 17.

Referring to FIG. 5 there is shown within the window 5 of the parent trunk 2 the first electrical wire 17 spliced with a suitable splice connection 4 made to the second electrical wire 15 of the takeout 3 with a first end and a second end.

A first splice extension 24 with a first end and a second end is shown suitably spliced at the first end by the splice connection 4 to the first end 22 of the first electrical wire 17. The second end of the first splice extension 24 is shown suitably spliced to the second electrical wire 15 by soldering, welding or winding by design choice. The third cofferdam 28 has been pulled over the splice connection 4 and the third cofferdam 28 has been filled with a suitable glutinous material to prevent the fluid flow within the wire insulation. A second splice extension 25 with a first end and a second end is shown suitably spliced at the first end by another splice connection 4 to the second end 23 of the first electrical wire 17. A fourth cofferdam 29 has been placed over the second splice connection 4 and is also filled with glutinous material. The second end of the first splice extension 24 and the second end of the second splice extension 25 are shown suitably connected to the second electrical wire 15 by a third splice connection 14 by soldering, welding, or winding by design choice. The glutinous material will further prevent fluid flow between the wire and insulation.

A shrink wrapped cofferdam 7 is shown loosely disposed around the first end of the takeout 3 and near the first end of the takeout 3.

Referring to FIG. 6 there is shown an elevation view of the second electrical wire 15 of the takeout 3 suitably spliced to the first electrical wire 17 of the parent trunk 2 within the window 5.

The shrink tube cofferdam 7 with a first end and a second end has been pulled around the third splice connection 14 at the second end of first splice extension 24, the second end of the second splice extension 25, and the second electrical wire 15 with the first end of the shrink tube cofferdam 7 being shrunk near the first end of the takeout 3 forming a fluid tight connection. A glutinous material 9 has been injected or poured into the second end of the shrink tube cofferdam 7 and has been allowed to cure to the desired consistency, firmness or viscosity, to prevent fluid or chemicals from flowing through a damaged or cut section of the takeout 3 and into the parent trunk 2.

Referring to FIG. 7 there is shown a second cofferdam 8 suitably placed around the parent trunk 2, the first end of the takeout 3 and further suitably covering the window 5 from past the first end of the window 5 to past the second end of the window 5 to the a desired location completely and circumferentially encapsulating the window 5 of the parent trunk 2. After the second cofferdam 8 is suitably placed around the takeout 3, the parent trunk 2, the fluid stop 1 and all of the splice connections, more glutinous material 9 is deposited in the second cofferdam 8 through an inlet 26 thus filling the second cofferdam 8 with the glutinous material 9 and allowing the air or gas to escape through a gas outlet 27 in the second cofferdam 8 until the second cofferdam 8 is suitably filled with glutinous material 9. The glutinous material 9 is allowed to cure to the desired and suitable consistency wherein the second cofferdam 8 is removed thus forming the outer seal 13 over the window 5, the parent trunk 2, the takeout 3, the fluid stop 1 and all of the splices as shown in FIG. 1.

Although the system described in detail supra has been found to be most satisfactory and preferred, many variations are possible. For example, various tubes may be part of the takeout or the takeout may have another takeout from the first takeout.

Although the invention has been described with reference to the preferred embodiment, it will be understood by those skilled in the art, that additions, modifications, substitutions, deletions and other changes not specifically described, may be made in the embodiment herein. It should be understood that the details herein are to be interpreted as illustrative and are not in a limiting sense.

What is claimed as invention:

1. A fluid stop wherein a first electrical wire contained in an existing parent trunk is spliced to a second electrical wire contained in a takeout wherein the device of splicing said second electrical wire contained in said takeout to said first electrical wire contained in said parent trunk is comprised of:

at least one window formed in said parent trunk and wherein said window has a first end and a second end, wherein said first electrical wire contained in said parent trunk is severed creating a first end of said first electrical wire and a second end of said first electrical wire;

said takeout has a first end and a second end, and wherein said second electrical wire is contained in said takeout;

at least one first splice extension with a first end and a second end wherein said first end of said first splice extension is fixed to said first end of said first electrical wire;

at least one second splice extension with a first end and a second end wherein said first end of said second splice extension is spliced to said second end of said first electrical wire;

said second electrical wire contained in said takeout with a first end and a second end wherein said first end of said second electrical wire is fixed to said second end of said first splice extension, and said first end of said second electrical wire is spliced to said second end of said second end of said second splice extension;

a first shrink tube cofferdam with a first end and a second end wherein said shrink tube cofferdam is placed around and over said first end of said second electrical wire that is spliced to said second end of said first splice extension and wherein said shrink tube cofferdam is further placed over and around said second end of said second splice extension and wherein said second end of said shrink tube cofferdam is shrunk on said takeout, near said first end of said takeout to form a fluid tight seal;

glutinous material wherein said glutinous material is viscous and is further pumped, poured, or injected into said first end of said shrink tube cofferdam and wherein said glutinous material cures and becomes less viscous than when said glutinous material was pumped, poured, or injected into said first end of said shrink tube cofferdam;

a second cofferdam wherein said second cofferdam is further placed around said parent trunk and extends past said first end of said window and said second cofferdam also extends past said second end of said window and said second cofferdam also extends over said shrink tube cofferdam filled with said cured glutinous material and said second cofferdam further extends past said first end of said takeout and wherein said second cofferdam is further filled with said glutinous material and wherein said glutinous material cures into a less viscous mass and wherein said second cofferdam may be removed after said glutinous material cures and forms a fluid tight covering for said fluid stop splice of the takeout to the parent trunk.

2. The fluid stop of claim 1 wherein said first electric wire and said second electric wire are tubes.

3. The fluid stop of claim 1 wherein said first electric wire and said second electric wire are conductors.

4. The fluid stop of claim 1 wherein said first electric wire and second electric wire are light transmitting fiber optics.

5. The fluid stop of claim 1 wherein each of said splices is comprised of a splice connection.

* * * * *